UNITED STATES PATENT OFFICE.

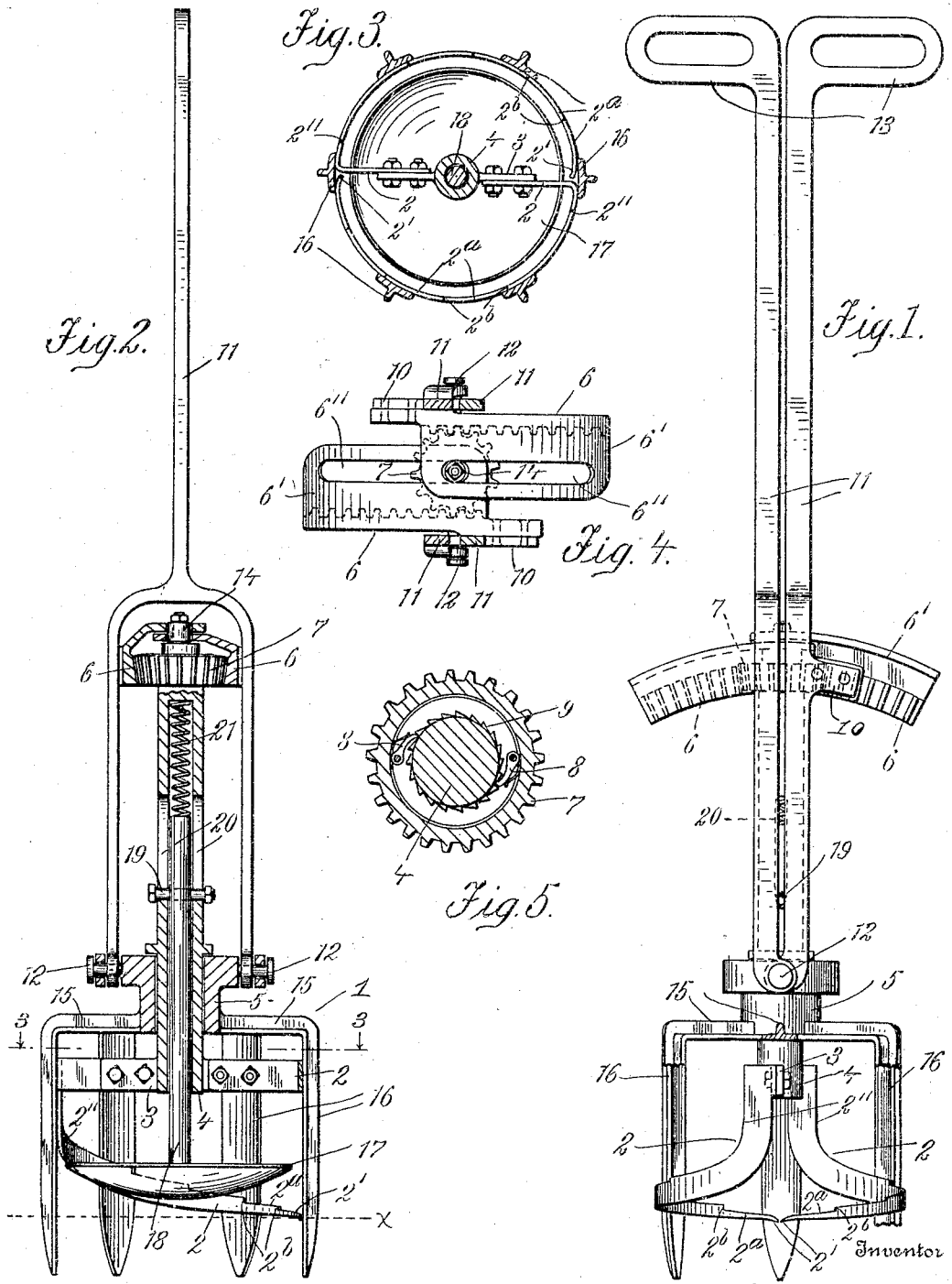

MILES E. GARWOOD, OF GEORGETOWN, WASHINGTON.

RUNNER-CUTTER AND PLANT-TOPPER.

959,003.  Specification of Letters Patent. Patented May 24, 1910.

Application filed August 26, 1909. Serial No. 514,816.

*To all whom it may concern:*

Be it known that I, MILES E. GARWOOD, a citizen of the United States of America, and a resident of the town of Georgetown, county of King, and State of Washington, have invented certain new and useful Improvements in Runner-Cutters and Plant-Toppers, of which the following is a specification.

My invention has for its primary object to provide an efficient device particularly adapted for cutting the runners of strawberry plants and also for topping such plants.

Other objects will be set forth as my description progresses, and those features of construction, arrangements and combinations of parts on which I desire protection, succinctly defined in my annexed claims.

Referring to the accompanying drawing wherein like numerals of reference indicate like parts throughout: Figure 1 is a side view of my invention with the plant spreader removed, parts being broken away. Fig. 2 is a vertical section thereof with the spreader in position. Fig. 3 is a section taken on line 3—3 of Fig. 2. Fig. 4 is a plan view in partial section illustrating the rack and pinion driven mechanism and the operating lever or handles therefor, and Fig. 5 is a sectional view, illustrating the pawl and ratchet connection between the pinion and cutter shaft.

In carrying out my invention, I provide a support 1, of open formation within which a pair of cutters 2 are supported for rotation, said cutters being fixed to a horizontal head 3 of a hollow, vertically disposed drive shaft 4, journaled in a hub or bearing 5 of support 1, as clearly shown in Fig. 2. For driving shaft 4 I employ spaced racks 6 engaged with a pinion 7, which latter is rotatably supported on the upper end portion of shaft 4 and provided with internally arranged pawls 8 engaging a ratchet wheel 9 thereof, by which construction intermittent rotation in one direction will be imparted by pinion 7 to the shaft, during reciprocatory movement of the racks 6. These racks 6 are curved as shown and supported on lugs 10, projecting from opposite outer side edges of operating levers or handles 11, which levers or handles are pivoted to opposite pins 12 on the hub 5 of support 1 and provided on their upper or free end portions with hand holds or grips 13, which like lugs 10 project from the outer side faces of said levers or handles, so as not to limit or interfere with said levers or handles in their movement toward one another. To prevent accidental disengagement of the racks from the pinion, I provide said racks with angular flanges 6', slotted longitudinally as at 6", for reception of the reduced upper end portion of shaft 4, on which, if desired, an anti-friction roller 14 may be journaled.

Support 1 comprises radial horizontal arms 15 formed integral with the hub or bearing 5 and provided at their outer ends with depending rigid members 16 arranged to act in conjunction with cutters 2 in effecting a cutting operation, and as now considered their lower end portions are preferably pointed, as shown, so that they can be readily engaged in the earth to steady the device, as will later be more fully set forth. The inner faces of members 16 are curved (see Fig. 3), concentrically to shaft 4 for engagement with cutters 2, whereby one side edge thereof will act in conjunction with the cutters to produce a shearing cut. Cutters 2 are substantially semi-circular in plan (see Fig. 3) and rise gradually from their toe portions 2', which are turned slightly in an inward and downward direction, in a rearward direction and terminate at their heels in comparatively long vertical cutting edges 2". The intermediate portions of the cutter are divided into alternating inclined and vertical cutting edges $2^a$ and $2^b$, the former acting primarily to lift and guide the runners and the latter, which are in the form of shoulder and bear a stepped relation to one another, acting to prevent crowding of the runners against the main cutting edges 2". Cutters 2 are preferably secured, as by bolts, as shown to head 3 with the toe portion of one substantially beneath the heel portion of the other.

In the operation of cutting plant runners, support 1 is arranged over the plant with members 16 forced into the ground to substantially the line $x$, shown in Fig. 2. The operator now swings levers or handles 11 toward one another thereby operating racks 6 to effect rotation of the cutters 2, as heretofore explained, during which operation the plant runners lying within the path of the cutters are picked up and then cut against the adjacent side edges of the members 16.

Where it is desired to "top" the plants, a spreader 17 comprising a convexed head is arranged within the support 1 as shown in Figs. 2 and 3, with its stem 18 slidably held in shaft 4, by a pin 19 projecting through slots 20 thereof. A spring 21 yieldingly resists upward movement of the spreader. Spreader 17 engages the plant and spreads the same so that the top portions thereof will be forced outwardly into the path of the cutters. This spreader in so far as the operation of the device is concerned can be maintained in operative position at all times, but unless it is desired to "top" the plants, it should obviously be removed.

Having thus described my invention, what I claim as new, and desire to secure by Letters Patent of the United States of America, is:

1. A device of the type set forth comprising a support, cutting means thereon, means for operating said cutting means, and a spreader carried by said support for engagement with the top of a plant to spread the same into the path of said cutting means.

2. A device of the type set forth comprising a support, cutting means thereon, means for operating said cutting means, and a yieldingly held spreader carried by said support for engagement with the top of a plant to spread the same into the path of said cutting means.

3. A device of the type set forth comprising a support, a plant spreader thereon supported for vertical movement, a cutter on said support supported for movement for cutting around said spreader, and means for operating said cutter.

4. A device of the type set forth comprising a support, a plant spreader thereon supported for vertical movement, means yieldingly holding said plant spreader against upward movement, a cutter rotatably supported on said support for movement for cutting around said plant spreader, and means for operating said cutter.

5. A device of the type set forth comprising a support having spaced depending members, a plant spreader arranged within said support, a rotatable cutter supported for movement for cutting around said spreader in engagement with the depending members of said support, and means for operating said cutter.

6. A device of the type set forth comprising a support of open formation having a vertically disposed side portion which is curved in cross section, a cutting means supported on said support for rotation about a vertical axis in engagement with said side portion of the support to obtain in conjunction therewith a shearing action, and means for rotating said cutting means.

7. A device of the type set forth comprising a support having spaced depending supporting members adapted for engagement in the ground, a drive shaft journaled on said support, means for operating said shaft, and a cutter fixed to said shaft for movement in a circular path in said support, said cutter having a downturned toe portion.

8. A device of the type set forth comprising a support having spaced depending members whose inner faces are concaved, a curved cutter arranged for engagement with the inner faces of the depending members of said support, means supporting said cutter for rotation, and means for operating said cutter.

9. A device of the type set forth comprising a support having spaced depending members, a shaft rotatably mounted on said support, a head fixed to said shaft, a cutter fixed to said head for movement in engagement with the depending members of said support, and means for operating said shaft.

10. A device of the type set forth comprising a support having spaced depending members, a pair of substantially semicircular cutters inclined downwardly toward their toe portions, means supporting said cutters for rotation with the toe portion of one beneath the heel portion of the other and in proximity to the depending members of said support for cutting engagement therewith, and means for rotating said first means.

11. A device of the type set forth comprising a support having spaced depending members, cutters arranged to engage the depending members of said support to obtain in conjunction therewith a shearing action, said cutters being curved and inclined downwardly toward their toe portions and formed with cutting edges arranged in stepped relation to one another, and means for operating said cutters.

12. A device of the type set forth comprising a support having spaced depending members, a cutter rotatably mounted on said support for cutting engagement with the depending members thereof, and means for operating said cutter.

13. A device of the type set forth comprising a support having spaced depending members, a cutter rotatably mounted on said support for cutting engagement with the depending members thereof, and means for operating said cutter, said cutter being curved in a downward direction to its toe portion.

14. A device of the type set forth comprising a support having spaced depending members, a cutter, a shaft supporting said cutter for rotary movement in cutting engagement with the depending members of said support, a lever pivoted to said support, a rack connected to said lever, and a pinion on said shaft in mesh with said rack.

15. A device of the type set forth comprising a support having spaced depending members, a cutter, a shaft supporting said cutter for rotary movement in cutting engagement with the depending members of said support, levers pivoted to said support, racks connected to said levers, and a pinion on said shaft arranged between said racks and being in mesh therewith.

16. A device of the type set forth comprising a support having spaced depending members, a cutter, a shaft supporting said cutter for rotary movement in cutting engagement with the depending members of said support, levers pivoted to said support, racks connected to said levers, and a pinion on said shaft arranged between said racks and being in mesh therewith, said pinion having a pawl and ratchet connection with said shaft, for the purpose specified.

Signed at Seattle, Washington this 20th day of August 1909.

MILES E. GARWOOD.

Witnesses:
FRANK SKINNER,
B. TEAGUE.